United States Patent

Salimi et al.

[11] Patent Number: 5,263,539
[45] Date of Patent: Nov. 23, 1993

[54] SCALE INHIBITION DURING OIL PRODUCTION

[75] Inventors: Mohammad H. Salimi, Houston; Karen C. Petty, Cypress; Claudia L. Emmett, Houston, all of Tex.

[73] Assignee: Petrolite Corporation, St. Louis, Mo.

[21] Appl. No.: 802,588

[22] Filed: Dec. 5, 1991

[51] Int. Cl.$^5$ .......................................... E21B 43/22
[52] U.S. Cl. ................................. 166/263; 166/279; 252/8.552
[58] Field of Search ............... 166/263, 279, 310, 371, 166/902; 252/8.552

[56] References Cited

U.S. PATENT DOCUMENTS

| | | | |
|---|---|---|---|
| 3,483,925 | 12/1969 | Slyker | 166/279 |
| 3,502,587 | 3/1970 | Stanford et al. | 252/8.552 X |
| 3,619,427 | 11/1971 | Kautsky | 252/8.552 X |
| 3,654,993 | 4/1972 | Smith | 166/279 |
| 3,706,717 | 12/1972 | Siegele | 252/180 X |
| 3,879,288 | 4/1975 | Siegele | 210/58 |
| 4,008,164 | 2/1977 | Watson et al. | 252/8.552 |
| 4,126,549 | 11/1978 | Jones et al. | 252/8.552 X |
| 4,253,968 | 3/1981 | Eastman | 210/698 |
| 4,342,652 | 8/1982 | Schiller et al. | 210/698 |
| 4,741,400 | 5/1988 | Underdown | 166/279 |
| 4,762,626 | 8/1988 | Emmons et al. | 252/8.552 |
| 4,860,829 | 8/1989 | Carlberg et al. | 252/8.552 X |
| 5,018,577 | 5/1991 | Pardue et al. | 166/279 |
| 5,038,861 | 8/1991 | Shuler | 252/8.552 X |

FOREIGN PATENT DOCUMENTS 1163429 3/1984 Canada .............................. 252/8.552

Primary Examiner—George A. Suchfield
Attorney, Agent, or Firm—Marcy M. Lyles; Richard A. Kretchmer

[57] ABSTRACT

A method and composition are provided for reducing occurrence of scale in a subterranean formation during an enhanced oil recovery process. A treatment composition comprising an amino phosphonic acid and a copolymer of an alkenyl sulfonate and an ethylenically unsaturated comonomer is squeezed into the formation.

18 Claims, No Drawings

SCALE INHIBITION DURING OIL PRODUCTION

The present invention is directed to a method and composition for inhibiting formation of mixed carbonate and sulfate scales in an aqueous environment containing iron ions and, more particularly, for inhibiting the formation of mixed scales in such an environment having low pH.

Scale formation in an oil-producing subterranean formation and in production equipment is a major problem because scale can plug fluid flow channels and prevent corrosion inhibitors from contacting equipment surfaces. Scale formation is initiated by a variety of factors including pressure, pH, temperature, and incompatibility of fluids. Once scale forms, it is difficult and expensive to remove, particularly barium sulfate scale.

Preferably, scale formation is inhibited in such an environment by the use of a scale inhibiting composition. However, scale inhibition in a subterranean formation during an enhanced oil recovery process can be difficult due to mixed scale formation and low pH (about 4 or lower) fluids containing iron ions. Incompatible fluids, which are conducive to formation of scale, are frequently encountered during brine waterflooding operations. For example, the injected fluid may contain a higher concentration of sulfate anions than the subterranean formation fluid, which contains a higher concentration of barium cations than the injected fluid. This is conducive to formation of barium sulfate scale. Inhibitors effective for inhibiting barium sulfate scales, such as polyphosphates and polyvinyl sulfonates, are less effective against calcium carbonate scales. Also, inhibitors effective for inhibiting calcium carbonate scales, such as phosphonates, phosphate esters, and polyacrylate based polymers, are less effective against barium sulfate scales in low pH environments. Further, many scale inhibitors tend to lose their negative charge at low pH, causing a decrease in scale inhibiting effectiveness; and inhibitors which reduce scale formation by chelating or otherwise complexing scale forming cations lose effectiveness in the presence of iron ions because a portion of the inhibitor will chelate or otherwise complex the iron ions rather than the scale forming cations.

Barium sulfate scale is becoming a frequent problem during enhanced oil recovery processes, especially in Alaska and in seawater areas because seawater is generally high in sulfate ions. In seawater areas such as the North Sea, barium and strontium sulfate scale formation is becoming a major problem as waterflooding operations involving seawater increase.

Often a fluid injected during an enhanced oil recovery process is saturated with carbon dioxide for improving oil recovery. Carbon dioxide injected into a subterranean formation in an enhanced oil recovery process dissolves in the subterranean formation fluid and forms carbonic acid, decreasing the pH of the fluid to about 4 or below. Low pH can cause corrosion which increases the concentration of iron ions in the fluid (many subterranean formation fluids contain some iron ions). Low pH also increases the solubility of calcium carbonate and iron ions in solution, thus decreasing formation of carbonate scales. However, sulfate scales still form at low pH. Therefore, low pH downhole conditions are conducive to formation of sulfate scales. As the subterranean formation fluids are produced, partial pressure of carbon dioxide decreases and precipitation of calcium carbonate and iron ions increases. Thus, carbonate and sulfate scales typically form. Therefore, uphole conditions are conducive to formation of carbonate and sulfate scales and the presence of iron ions.

An effective scale inhibiting composition for this environment must be capable of inhibiting formation of sulfate scales at low pH and must be capable of inhibiting formation of mixed scales as pH increases. Also, the composition must be effective in the presence of iron ions and soluble in high calcium concentration fluids, which are commonly encountered in enhanced oil recovery processes. Further, the scale inhibiting composition must be stable up to about 350° F. for withstanding high subterranean formation temperatures and must maintain stability and pumpability at temperatures down to about −40° F. for use in cold environments.

Developing a scale inhibiting composition for such an environment is not as simple as mixing any barium sulfate scale inhibitor with any calcium carbonate scale inhibitor. Problems can occur when two different inhibitors are mixed together. The inhibitors may be physically incompatible, i.e., one inhibitor may cause the other inhibitor to precipitate out of solution; or the inhibitors may be chemically incompatible, i.e., one inhibitor may interfere with the scale inhibiting effectiveness of the other. One inhibitor may hydrolyze at high temperatures and therefore decrease the overall inhibition effectiveness of the mixture. Further, subterranean formation and fluids seawaters generally have a high concentration of calcium and many inhibitors are not soluble in high calcium concentration fluids.

U.S. Pat. No. 3,706,717 (Siegele) discloses a copolymer suitable for inhibiting scale formation in evaporators, cooling towers, heat exchangers, boilers and other devices for aqueous systems.

U.S. Pat. No. 4,342,652 (Schiller et al.) discloses use of such a copolymer for reducing scaling due to calcium carbonate and magnesium hydroxide in evaporative desalination units.

U.S. Pat. No. 4,741,400 (Underdown) discloses a method for inhibiting formation of scale by injecting at least one scale inhibitor into the formation and then injecting a copolymer into the formation for prolonging the inhibition of scale formation.

U.S. Pat. No. 5,018,577 (Pardue, et al.) discloses a method of inhibiting calcium carbonate and barium sulfate scales utilizing a predominantly phosphonate containing scale inhibitor composition.

None of these patents are directed toward inhibition of mixed scale formation in a low pH, iron ion-containing environment.

To the best of our knowledge, compatible mixtures of inhibitors for calcium carbonate scale and barium sulfate scale at low pH which are effective in the presence of iron ions are not commercially available. Use of two separate treatments, the first comprising one type of scale inhibitor, and the second comprising another type of scale inhibitor, is costly. A need exists for a composition and method for inhibiting formation of calcium carbonate and barium sulfate scales in a low pH, iron ion-containing environment.

The general object of the present invention is to provide a method and composition suitable for inhibiting formation of mixed carbonate and sulfate scales in an aqueous environment containing iron ions. A more specific object is to provide such a method and composition for inhibiting mixed scales in a low pH aqueous environment containing iron ions. Further objects of the present invention shall appear hereinafter.

The objects of the present invention can be attained by a method for treating an aqueous environment, the method comprising introducing into the environment a composition effective for reducing occurrence of scale, the composition comprising an amino phosphonic acid and a copolymer of an alkenyl sulfonic acid and an ethylenically unsaturated comonomer.

In a first aspect, the invention is a composition suitable for reducing occurrence of scale, the composition comprising an amino phosphonic acid and a copolymer of an alkenyl sulfonic acid and an ethylenically unsaturated comonomer.

In a second aspect, the invention is a method for treating an aqueous environment comprising introducing into the aqueous environment a composition effective for reducing occurrence of scale, the composition comprising an amino phosphonic acid and a copolymer of an alkenyl sulfonic acid and an ethylenically unsaturated comonomer.

In a third aspect, the invention is a method for improving recovery of hydrocarbons from a subterranean formation, the method comprising introducing into the subterranean formation a composition comprising an amino phosphonic acid and a copolymer of an alkenyl sulfonic acid and an ethylenically unsaturated comonomer.

Composition

The composition of the present invention is comprised of an amino phosphonic acid or monovalent salts thereof. Generally, the amino phosphonic acid is a polyalkylene polyamino polykis methylene phosphonic acid, such as an alkylene polyamine-N substituted-methylene phosphonic acid. More specifically, the amino phosphonic acid is a bishexamethylene triamine pentamethylene phosphonic acid which can be prepared by use of the Mannich reaction from bishexamethylene triamine, phosphorous acid, and formaldehyde.

The composition is further comprised of a copolymer of an alkenyl sulfonic acid and an ethylenically unsaturated comonomer or monovalent salts of the copolymer. Generally, the copolymer is an alkenyl sulfonic acid/maleic acid copolymer or a vinyl sulfonic acid/maleic acid copolymer. More specifically, the copolymer is an allyl sulfonic acid/maleic acid compound copolymer. Representative maleic acid compounds are fumaric acid, methacrylic acid, styrene, maleic or fumaric anhydride, or acrylic acid.

The Siegele and Schiller et al. U.S. Pat. Nos. (3,706,717 and 4,342,652), which are hereby incorporated by reference, disclose such a copolymer.

A useful copolymer is derived from about 25 to about 90 mole percent of maleic acid and from about 75 to about 10 mole percent of allyl sulfonic acid, preferably about 40 to 60 mole percent of maleic acid. Generally, the copolymer has a molecular weight in the range of about 500 to about 25,000, preferably about 500 to 10,000.

The composition can further comprise a sufficient amount of alcohol or glycol for maintaining the stability and pumpability of the composition down to about $-40°$ F. Methanol and ethylene glycol are suitable for use in this composition.

The composition of this invention can comprise about 8 wt % and above of the phosphonic acid (weight percents are based on active composition weight). About 8 wt % to about 27 wt % of the phosphonate is desirable. The composition can further comprise up to about 15 wt % of the copolymer. Above about 15 wt % the solubility of the copolymer decreases below an acceptable level. About 4 wt % to about 15 wt % of the copolymer is desirable. Generally, the concentration of the alcohol or glycol in the composition is about 8 wt % to about 25 wt %. A suitable composition for this invention comprises about 27 wt % of the phosphonic acid, about 15 wt % of the copolymer, and about 10 wt % of methanol. Generally, the composition of this invention is a concentrate which is diluted for use in treating subterranean formations.

A suitable composition has a flash point of about 83° F., a pH (neat) of about 1 or less, is soluble in water and in brines containing up to about 12,000 mg/l calcium, and has a density of about 10.3 lb/gal. An ammonia additive, such as ammonium hydroxide, is suitable for neutralizing the composition if neutralization is desired.

The composition is effective for inhibiting formation of sulfate and carbonate scales in an oilfield environment. The composition is advantageous because it provides effective carbonate and sulfate scale inhibition at low as well as neutral pH, and in the presence of iron ions. The composition is particularly advantageous for use in oil field operations where downhole conditions are low pH and conducive to the formation of barium sulfate scales and uphole conditions have increased pH and iron ions present and are therefore conducive to the formation of calcium carbonate scales. More specifically, the preferred composition maintains its effectiveness at pHs down to about 2, is stable at temperatures of from about $-40°$ F. to about 350° F., is tolerant of soluble iron, and is soluble in brine concentrations up to about 12,000 mg/l calcium.

Method

Broadly speaking, the composition of this invention is useful for both uphole and downhole scale inhibition and is generally introduced into a subterranean formation by any known technique. In a preferred method, the composition is utilized during secondary and tertiary oil recovery methods. As is well known in the art, enhanced recovery methods comprise introduction of fluids, such as polymers and/or brines, into a subterranean formation through a wellbore. Tertiary recovery methods generally comprise introduction of a fluid such as carbon dioxide into the formation. The composition can be introduced into the formation by a squeeze treatment in which the composition is injected into a wellbore of a production well to place the inhibitor into the surrounding subterranean formation.

In an environment where oil is being produced from a subterranean formation, the following procedure is desirable for preventing scale formation.

A producing well is shut-in.

A mutual solvent is injected into the subterranean formation through the production wellbore for removing hydrocarbon coatings from the matrix of the formation and leaving the formation water-wet for maximum adhesion of the scale inhibiting composition. The mutual solvent also prevents emulsions when the well is returned to production.

Scale inhibitor volume is based on the current volume of water production, the porosity of the subterranean formation rock, and the net producing interval. The scale inhibiting composition is injected into the formation as a solution of chemical and filtered water. A desired treating level is up to about 25 ppm of scale inhibiting composition. If required, the water can be treated with oxygen scavenger.

Water or other suitable fluid is introduced into the formation for displacing the scale inhibitor about 5 ft into the subterranean formation. This is referred to as "overflushing."

A continuous shut-in time of about 18-24 hours following placement of the composition in the subterranean formation provides an opportunity for the scale inhibiting composition to properly adsorb to the rock matrix of the subterranean formation for maximizing scale inhibiting effectiveness.

The well is then returned to production.

EXAMPLES

In the following Examples, wt %s are based on active composition weight.

A standard inhibiting composition of this invention (COMPOSITION) comprising about 27 wt % of a bishexamethylene triamine pentamethylene phosphonic acid (PHOSPHONIC ACID), about 15 wt % of an allyl sulfonic acid/maleic acid compound copolymer (COPOLYMER), and about 10 wt % of methanol in an aqueous solution, was prepared and utilized in the following Examples.

EXAMPLE I $CaCO_3$ Scale Inhibition at pH of 7

An aqueous solution comprising about 4140 ppm $CaCO_3$ and about 33,000 ppm NaCl was saturated with $CO_2$. Samples of the solution were treated at a temperature of about 190° F. and a pH of about 7 for about 18 hours with the COPOLYMER ACID, with the PHOSPHONIC, and with the COMPOSITION with the results shown in Tables 1-3. (In the Tables, the far right column provides dataset identifiers for ease of referral.)

TABLE 1

| ACTIVE COPOLYMER ppm | % $CaCO_3$ SCALE INHIBITION ≈ pH of 7 | |
|---|---|---|
| 0.5 | 0 | 1a |
| 1.0 | 10 | 1b |
| 2.5 | 36 | 1c |
| 5.0 | 53 | 1d |
| 10.0 | 81 | 1e |

TABLE 2

| ACTIVE PHOSPHONIC ACID ppm | % $CaCO_3$ SCALE INHIBITION ≈ pH of 7 | |
|---|---|---|
| 0.45 | 4 | 2a |
| 0.9 | 29 | 2b |
| 2.25 | 73 | 2c |
| 4.5 | 93 | 2d |
| 9 | 93 | 2e |

TABLE 3

| ACTIVE COMPOSITION OF THIS INVENTION ppm | ACTIVE COPOLYMER ppm | ACTIVE PHOSPHONIC ACID ppm | % $CaCO_3$ SCALE INHIBITION ≈ pH of 7 | |
|---|---|---|---|---|
| .42 | .15 | .27 | 0 | 3a |
| .84 | .3 | .54 | 9 | 3b |

TABLE 3-continued

| ACTIVE COMPOSITION OF THIS INVENTION ppm | ACTIVE COPOLYMER ppm | ACTIVE PHOSPHONIC ACID ppm | % $CaCO_3$ SCALE INHIBITION ≈ pH of 7 | |
|---|---|---|---|---|
| 2.1 | .75 | 1.35 | 46 | 3c |
| 4.2 | 1.5 | 2.7 | 75 | 3d |
| 8.4 | 3 | 5.4 | 95 | 3e |

EXAMPLE II $BaSO_4$ Scale Inhibition at pH of 7

Samples of an aqueous solution comprising about 400 ppm $BaSO_4$ and about 50,000 ppm NaCl were treated at a temperature of about 160° F. and a pH of about 7 for about 3 hours with the COPOLYMER ACID, with the PHOSPHONIC and with the COMPOSITION with the results shown in Tables 4-6.

TABLE 4

| ACTIVE COPOLYMER ppm | % $BaSO_4$ SCALE INHIBITION ≈ pH 7 | |
|---|---|---|
| 0.5 | 9 | 4a |
| 1.0 | 20 | 4b |
| 2.5 | 75 | 4c |
| 5.0 | 100 | 4d |
| 10.0 | 96 | 4e |

TABLE 5

| ACTIVE PHOSPHONIC ACID ppm | % $BaSO_4$ SCALE INHIBITION ≈ pH 7 | |
|---|---|---|
| .45 | 18 | 5a |
| .9 | 57 | 5b |
| 2.25 | 94 | 5c |
| 4.5 | 95 | 5d |
| 9 | 96 | 5e |

TABLE 6

| ACTIVE COMPOSITION OF THIS INVENTION ppm | ACTIVE COPOLYMER ppm | ACTIVE PHOSPHONIC ACID ppm | % $BaSO_4$ SCALE INHIBITION ≈ pH of 7 | |
|---|---|---|---|---|
| .42 | .15 | .27 | 7 | 6a |
| .84 | .3 | .54 | 38 | 6b |
| 2.1 | .75 | 1.35 | 92 | 6c |
| 4.2 | 1.5 | 2.7 | 97 | 6d |
| 8.4 | 3 | 5.4 | 97 | 6e |

EXAMPLE III $BaSO_4$ Scale Inhibition at pH of 4

Samples of an aqueous solution comprising about 400 ppm $BaSO_4$ and about 50,000 ppm NaCl were treated at a temperature of about 160° F. and a pH of about 4 for about 3 hours with the COPOLYMER ACID, with the PHOSPHONIC, and with the COMPOSITION of this invention, with the results shown in Tables 7-9.

TABLE 7

| ACTIVE COPOLYMER ppm | % $BaSO_4$ SCALE INHIBITION ≈ pH 4 | |
|---|---|---|
| 1.0 | 20 | 7a |
| 1.5 | 32 | 7b |
| 2.5 | 66 | 7c |

TABLE 7-continued

| ACTIVE COPOLYMER ppm | % BaSO$_4$ SCALE INHIBITION ≈ pH 4 | |
|---|---|---|
| 5.0 | 80 | 7d |
| 10.0 | 93 | 7e |
| 20.0 | 95 | 7f |

TABLE 8

| ACTIVE PHOSPHONIC ACID ppm | % BaSO$_4$ SCALE INHIBITION ≈ pH 4 | |
|---|---|---|
| 0.9 | 0 | 8a |
| 2.25 | 2 | 8b |
| 4.5 | 2 | 8c |
| 9 | 5 | 8d |
| 18 | 8 | 8e |

TABLE 9

| ACTIVE COMPOSITION OF THIS INVENTION ppm | ACTIVE COPOLYMER ppm | ACTIVE PHOSPHONIC ACID ppm | % BaSO$_4$ SCALE INHIBITION ≈ pH of 4 | |
|---|---|---|---|---|
| .84 | .3 | .54 | 1 | 9a |
| 2.1 | .75 | 1.35 | 10 | 9b |
| 4.2 | 1.5 | 2.7 | 70 | 9c |
| 8.4 | 3 | 5.4 | 88 | 9d |
| 16.8 | 6 | 10.8 | 95 | 9e |

Surprisingly, referring for example to Table 9, dataset 9c, the treatment with 4.2 ppm COMPOSITION of this invention (1.5 ppm COPOLYMER and 2.7 ppm PHOSPHONIC ACID) results in 70% inhibition of BaSO$_4$ scale at pH 4 when 1.5 ppm COPOLYMER results in only 32% BaSO$_4$ scale inhibition at pH 4 (see Table 7, dataset 7b) and 4.5 ppm PHOSPHONIC ACID results in only 2% BaSO$_4$ scale inhibition of this invention (see Table 8, dataset 8c).

EXAMPLE IV

BaSO$_4$ Scale Inhibition at pH of 4.5 with and without Fe$^{2+}$

Samples of an aqueous solution comprising about 40 ppm Ba$^{2+}$, about 300 ppm SO$_4^{2-}$, and about 32,000 ppm NaCl were treated at a temperature of about 160° F. and a pH of about 4.5 for about 3 hours with the COMPOSITION of this invention and with the diethylene triaminepenta [methylene phosphonic acid] (COMMERCIAL PRODUCT), a commercially available scale inhibiting composition for an oil field environment, with the results as shown in Table 10. Twenty-five ppm Fe$^{2+}$ was added to the aqueous solution and the treatments were repeated, with the results shown in Table 11.

TABLE 10

| | ≈ pH 4.5 (without Fe$^{2+}$) | | |
|---|---|---|---|
| ACTIVE COMPOSITION ppm | % BaSO$_4$ SCALE INHIBITION ≈ pH 4.5 | ACTIVE COMMERCIAL PRODUCT ppm | % BaSO$_4$ SCALE INHIBITION ≈ pH 4.5 |
| .42 | 0 | .5 | 6 |
| 1.26 | 14 | 1.5 | 23 |
| 2.1 | 46 | 2.5 | 34 |
| 4.2 | 74 | 5 | 86 |
| 8.4 | 89 | 10 | 91 |

TABLE 11

| | ≈ pH 4.5 (with Fe$^{2+}$) | | |
|---|---|---|---|
| ACTIVE COMPOSITION OF THIS INVENTION ppm | % BaSO$_4$ SCALE INHIBITION ≈ pH 4.5 | ACTIVE COMMERCIAL PRODUCT ppm | % BaSO$_4$ SCALE INHIBITION ≈ pH 4.5 |
| .42 | 0 | .5 | 0 |
| 1.26 | 0 | 1.5 | 0 |
| 2.1 | 16 | 2.5 | 4 |
| 4.2 | 34 | 5 | 7 |
| 8.4 | 83 | 10 | 19 |

Referring to Table 10, in the treatments of the aqueous solution without Fe$^{2+}$ at pH 4.5, the BaSO$_4$ scale inhibition performance of COMPOSITION and COMMERCIAL PRODUCT are comparable. Referring to Table 11, in the presence of Fe$^{2+}$ at pH 4.5, COMPOSITION continues to inhibit the BaSO$_4$ somewhat effectively, although with a decreased efficiency compared to the treatment without Fe$^{2+}$. However, the COMMERCIAL PRODUCT was virtually ineffective at inhibiting BaSO$_4$ scale in the presence of Fe$^{2+}$ at pH 4.5.

Although the method and composition of the present invention have been described in relation to various specific examples and embodiments, it is to be understood that the invention is not limited thereto.

What is claimed is:

1. A method for treating a subterranean formation which contains low or neutral pH fluids, comprising:
   introducing into the subterranean formation through a wellbore a treatment composition comprising an amino phosphonic acid and a copolymer of an alkenyl sulfonic acid compound and an ethylenically unsaturated comonomer, wherein the amount of said treatment composition is effective to inhibit the formation of scale in the formation.

2. A method of claim 1 comprising introducing a sufficient volume of filtered water into the subterranean formation for displacing the treatment composition about 5 ft into the subterranean formation.

3. A method of claim 1 comprising shutting in the wellbore for a sufficient period of time to allow the treatment composition to adsorb to the subterranean formation rock matrix for maximizing scale inhibiting effectiveness.

4. A method of claim 3 comprising shutting in the wellbore for about 18 to 24 hours.

5. A method of claim 1 in which the pH of fluid in the subterranean formation is less than about 4.5.

6. The method of claim 1, in which the amino phosphonic acid comprises an alkylene polyamine-N substituted-methylene phosphonic acid.

7. The method of claim 1, in which the amino phosphonic acid comprises a bishexamethylene triamine pentamethylene phosphonic acid.

8. The method of claim 1, in which the amino phosphonic acid alkenyl sulfonic acid/maleic acid copolymer.

9. The method of claim 1, in which the copolymer comprises as allyl sulfonic acid/maleic acid copolymer.

10. The method of claim 1, in which the weight ratio of the amino phosphonic acid to the copolymer is about 8-27 to about 4-15.

11. A method for treating a subterranean formation which contains low pH fluids, comprising:
   introducing into the subterranean formation a treatment composition comprising an amino phosphonic acid and a copolymer of an alkenyl sulfonic acid compound and an ethylenically unsaturated comonomer, wherein the amount of said treatment composition is effective to inhibit the formation of scale in the formation.

12. A method of claim 11 in which the subterranean formation is characterized by the presence of iron ions in the fluids.

13. An enhanced oil recovery process comprising:
   introducing into a subterranean formation through an injection wellbore a fluid for displacing oil toward a production wellbore;
   shutting in the production wellbore;
   introducing into the subterranean formation through the production wellbore a treatment composition comprising an amino phosphonic acid and a copolymer of an alkenyl sulfonic acid compound and an ethylenically unsaturated comonomer for inhibiting formation of scale in the formation; and
   producing fluids through the production wellbore.

14. The method of claim 13, in which the amino phosphonic acid comprises an alkylene polyamine-N substituted-methylene phosphonic acid.

15. The method of claim 13, in which the amino phosphonic acid comprises a bishexamethylene triamine pentamethylene phosphonic acid.

16. The method of claim 13, in which the copolymer comprises an alkenyl sulfonic acid/maleic acid copolymer.

17. The method of claim 13 in which the copolymer comprises an allyl sulfonic acid/maleic acid copolymer.

18. The method of claim 13, in which the weight ratio of the amino phosphonic acid to the copolymer is about 8–27 to about 4–15.

* * * * *